US011417297B2

(12) United States Patent
Ha et al.

(10) Patent No.: US 11,417,297 B2
(45) Date of Patent: Aug. 16, 2022

(54) DISPLAY APPARATUS AND CONTROL METHOD THEREOF

(71) Applicant: SAMSUNG ELECTRONICS CO., LTD., Suwon-si (KR)

(72) Inventors: Seongho Ha, Suwon-si (KR); Hoseon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/685,569

(22) Filed: Nov. 15, 2019

(65) Prior Publication Data

US 2020/0184931 A1 Jun. 11, 2020

(30) Foreign Application Priority Data

Dec. 10, 2018 (KR) .......................... 10-2018-0158217

(51) Int. Cl.
*G09G 5/377* (2006.01)
*G06T 3/40* (2006.01)
*H04N 5/265* (2006.01)

(52) U.S. Cl.
CPC .......... *G09G 5/377* (2013.01); *G06T 3/4092* (2013.01); *H04N 5/265* (2013.01); *G09G 2340/0407* (2013.01); *G09G 2340/125* (2013.01); *G09G 2360/02* (2013.01); *G09G 2370/022* (2013.01)

(58) Field of Classification Search
None
See application file for complete search history.

(56) References Cited

U.S. PATENT DOCUMENTS

| 7,096,487 B1 | 8/2006 | Gordon et al. |
| 8,542,265 B1* | 9/2013 | Dodd ....................... H04N 7/15 348/14.08 |
| 8,928,680 B1* | 1/2015 | Sanketi .................... G06T 1/60 345/543 |
| 9,161,030 B1 | 10/2015 | Masterson et al. |
| 2011/0164184 A1* | 7/2011 | Avkarogullari ....... G06F 3/1431 348/571 |
| 2013/0169866 A1 | 7/2013 | Kim |

(Continued)

FOREIGN PATENT DOCUMENTS

| CN | 103188449 A | 7/2013 |
| CN | 105278903 A | 1/2016 |

(Continued)

OTHER PUBLICATIONS

International Search Report and Written Opinion dated Apr. 8, 2020 issued by the International Searching Authority in counterpart International Application No. PCT/KR2019/017226 (PCT/ISA/210 and PCT/ISA/237).

(Continued)

*Primary Examiner* — Michelle Chin
(74) *Attorney, Agent, or Firm* — Sughrue Mion, PLLC

(57) ABSTRACT

A display apparatus includes a display, a communicator configured to communicate with a server, and a processor. The processor is configured to control the communicator to transmit graphic data to be displayed on the display to the server, control the communicator to receive from the server video data into which the graphic data is converted, and process and display the received video data on the display.

15 Claims, 13 Drawing Sheets

(56) References Cited

U.S. PATENT DOCUMENTS

| | | | |
|---|---|---|---|
| 2013/0194500 A1 | 8/2013 | Na et al. | |
| 2014/0215508 A1* | 7/2014 | Wyatt | H04N 5/262 725/24 |
| 2014/0292778 A1 | 10/2014 | Wang et al. | |
| 2014/0292803 A1 | 10/2014 | Cook | |
| 2016/0119571 A1 | 4/2016 | Ko | |
| 2016/0225123 A9* | 8/2016 | Deach | G06T 3/40 |
| 2017/0201797 A1 | 7/2017 | Kwon | |
| 2017/0230603 A1* | 8/2017 | Kim | G09G 5/391 |
| 2017/0270635 A1 | 9/2017 | Chun et al. | |
| 2017/0332116 A1* | 11/2017 | Lee | H04N 21/6373 |
| 2018/0234713 A1 | 8/2018 | Kwon et al. | |

FOREIGN PATENT DOCUMENTS

| | | |
|---|---|---|
| CN | 108429924 A | 8/2018 |
| ER | 2 202 964 A2 | 6/2010 |
| KR | 10-0859661 B1 | 9/2008 |
| KR | 10-2010-0077924 A | 7/2010 |

OTHER PUBLICATIONS

Communication dated Apr. 14, 2020 issued by the European Intellectual Property Office in counterpart European Application No. 19214314.7.

Communication dated Aug. 2, 2021 by the State Intellectual Property Office of P.R. China in counterpart Chinese Patent Application No. 201911248761.8.

"Color space", Wikipedia, Nov. 5, 2018, 8 pages total, XP055856731, https://en.wikipedia.org/w/index.php?title=Color_space&oldid=867368982.

"Color management", Wikipedia, Oct. 16, 2018, 8 pages total, XP055856734, https://en.wikipedia.org/w/index.php?title=Color_management&oldid=864397014.

"Image scaling", Wikipedia, Nov. 17, 2018, 6 pages total, XP055856738, https://en.wikipedia.org/w/index.php?title=Image_scaling&oldid=869209249.

Communication dated Nov. 10, 2021 issued by the European Patent Office in European Application No. 19 214 314.7.

Communication dated Mar. 8, 2022, issued by the Intellectual Property India in Indian Patent Application No. 202117024999.

Communication dated Mar. 22, 2022, issued by the China National Intellectual Property Administration in Chinese Application No. 201911248761.8.

* cited by examiner

DISPLAY APPARATUS AND CONTROL METHOD THEREOF

CROSS-REFERENCE TO RELATED APPLICATION(S)

This application is based on and claims priority under 35 U.S.C. § 119 to Korean Patent Application No. 10-2018-0158217 filed on Dec. 10, 2018 in the Korean Intellectual Property Office, the disclosure of which is incorporated by reference herein in its entirety.

BACKGROUND

Field

The disclosure relates to a display apparatus and a control method thereof, and more particularly, to a display apparatus that processes and displays high resolution graphics, and a control method thereof.

Description of the Related Art

Recently, display apparatuses provided with high resolution panels are launched on the market. In particular, 8K televisions (TV) can provide a user with pictures having higher definition by four times than related art 4K TVs or ultrahigh definition (UHD) TVs.

In a case of videos, the related art 8K TVs may process the 8K resolution videos to be displayed. However, in the case of graphics, the related art 8K TVs support only up to 2K resolution and the 8K graphics are displayed in not original resolution but 2K resolution by the related art 8K TVs. Accordingly, a problem of the image quality degradation occurs in processing and displaying the graphics.

SUMMARY

According to embodiments of the disclosure, there is provided a display apparatus capable of displaying graphics of high resolution without image quality degradation.

In accordance with an aspect of the disclosure, there is provided a display apparatus including: a display; a communicator configured to communicate with a server; and a processor configured to: control the communicator to transmit graphic data to be displayed on the display to a server, control the communicator to receive from the server video data into which the graphic data is converted, and process and display the received video data on the display.

The processor may divide the graphic data to first graphic data and second graphic data, control the communicator to transmit the first graphic data to the server, and directly process and display the second graphic data on the display.

The processor may synthesize first video data received from the server with the second graphic data, and display the synthesized data on the display, wherein the first video data is converted from the first graphic data.

The second graphic data may be greater in a degree of change in image or video than the first graphic data.

The received first video data may include video data converted from the graphic data after being upscaled in the server.

The processor may process the second graphic data without conversion into video data.

The processor may synthesize the video data received from the server with directly processed video data and display the synthesized data on the display.

The processor may include a graphics processor, and the graphics processor may directly process and display a partial region of the graphic data corresponding to a resolution processible by the graphics processor.

The processor may control graphic data, which is given for a remaining region other than the partial region corresponding to the resolution processible by the graphics processor, of the graphic data to be transmitted to the server.

The processor may receive video data, into which the graphic data of the remaining region is converted, from the server through the communicator, synthesize the received video data with the graphic data of the partial region directly processed by the graphics processor, and display synthesized data on the display.

In accordance with an aspect of the disclosure, there is provided a display apparatus including: a display; and a processor configured to convert graphic data to be displayed on the display into video data, and processes and displays the video data on the display.

In accordance with an aspect of the disclosure, there is provided a control method of a display apparatus including a display, the control method including: transmitting graphic data to be displayed on the display to a server; receiving from the server video data into which the graphic data is converted; and processing and displaying the received video data on the display.

The method may further include dividing the graphic data into first graphic data and second graphic data, transmitting the first graphic data to the server, and directly processing and displaying the second graphic data on the display.

The method may further include synthesizing first video data received from the server with the second graphic data, and displaying the synthesized data on the display.

The method may further include directly processing and displaying the second graphic data on the display includes processing the second graphic data without conversion to video data.

The method may further include synthesizing the video data received from the server with the directly processed video data and displaying the synthesized data on the display.

The method may further include directly processing and displaying graphic data, which is given for a partial region corresponding to a resolution processible by the graphic data, of the graphic data by the graphics processor.

The method may further include controlling graphic data, which is given for a remaining region other than the partial region corresponding to the resolution processible by the graphics processor, of the graphic data to be transmitted to the server.

BRIEF DESCRIPTION OF THE DRAWINGS

The above and other aspects, features, and advantages of certain embodiments of the present disclosure will be more apparent from the following description, taken in conjunction with the accompanying drawings, in which.

DETAILED DESCRIPTION

Figure 1:
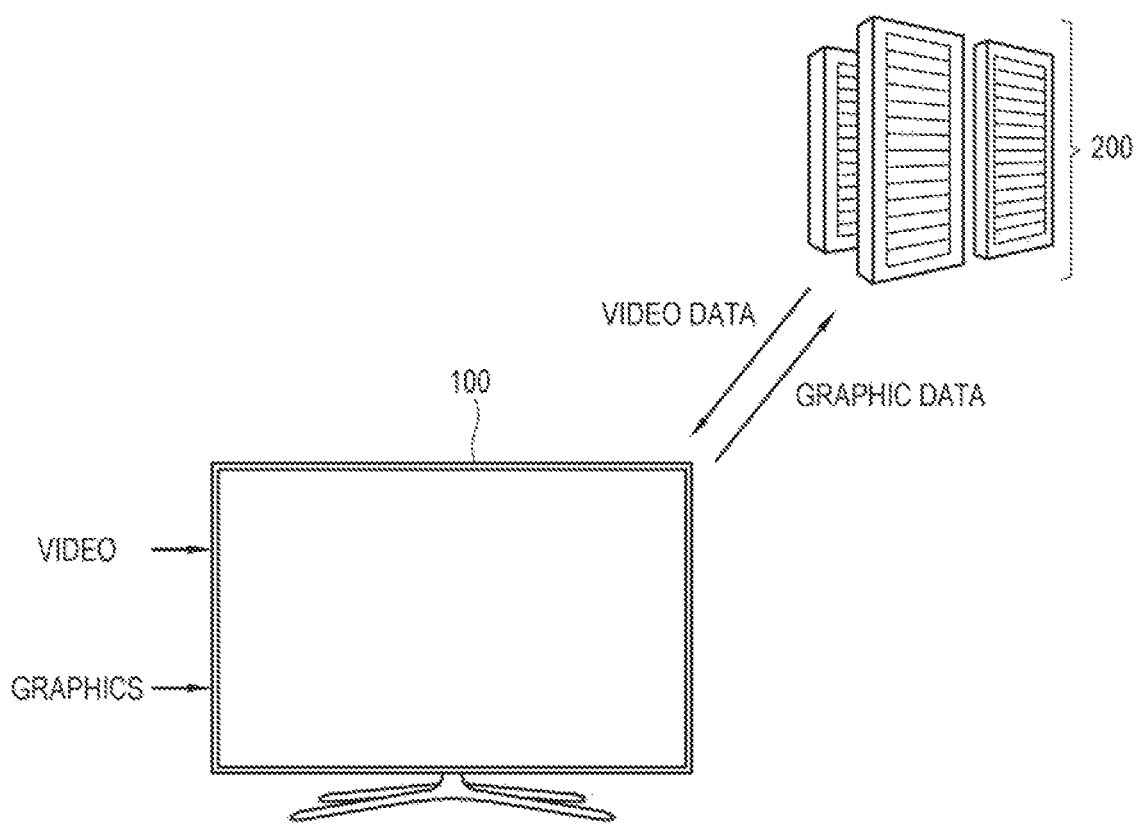
FIG. 1 is a view showing a display device and a server according to an embodiment.

Below, certain embodiments will be described in detail with reference to accompanying drawings. In the drawings, like numerals or symbols refer to like elements having substantially the same function, and the size of each element may be exaggerated for clarity and convenience of description. However, the configurations and functions illustrated in the following embodiments are not construed as limiting the present inventive concept and the key configurations and functions. In the following descriptions, details about publicly known functions or features will be omitted when it is determined that they cloud the gist of the disclosure.

In the following embodiments, terms 'first', 'second', etc. are only used to distinguish one element from another, and singular forms are intended to include plural forms unless otherwise mentioned contextually. In the following embodiments, it will be understood that terms 'comprise', 'include', 'have', etc. do not preclude the presence or addition of one or more other features, numbers, steps, operations, elements, components or combination thereof. In addition, a 'module' or a 'portion' may perform at least one function or operation, be achieved by hardware, software (S/W) or combination of hardware and software, and be modularized into at least one processor. Further, in the following embodiments, at least one among a plurality of elements refers to not only all of the plurality of elements but also each element among the plurality of elements excluding the other elements or a combination thereof. Further, the expression of "configured to (or set to)" may for example be replaced with "suitable for," "having the capacity to," "designed to," "adapted to," "made to," or "capable of" according to circumstances. Also, the expression of "configured to (or set to)" may not necessarily refer to only "specifically designed to" in terms of hardware. Instead, the "device configured to" may refer to "capable of" along with other devices or parts in a certain circumstance. For example, the phrase of "the processor configured to perform A, B, and C" may refer to a dedicated processor (e.g. an embedded processor) for performing the corresponding operations, or a generic-purpose processor (e.g. a central processing unit (CPU) or an application processor) for performing the corresponding operations by executing one or more software programs stored in a memory device.

FIG. 1 shows a display apparatus according to an embodiment. The display apparatus 100 according to an embodiment may be a TV. Also, the display apparatus 100 according to an embodiment may be any apparatus being capable of displaying images of contents thereon, including an electronic picture frame, a digital billboard, a Large Format Display (LFD), a digital signage, a smart phone, a tablet, a mobile phone, a smart watch, a wearable device such as a Head-Mounted Display, a computer, a multimedia player, a smart refrigerator, etc. However, the display apparatus 100 is not limited thereto, and any apparatus being capable of displaying images may be used. Also, the disclosure is applicable to an image processing device which does not include a display. That is, the disclosure can be embodied in any apparatus being capable of processing and outputting an image even when the apparatus does not directly display the image thereon.

The display apparatus 100 according to an embodiment is capable of performing communications with one or more servers 200. Specifically, the display apparatus 100 is capable of transmitting graphic data to the server 200, and receiving from the server 200 video data to which the transmitted graphic data is converted.

Figure 2:
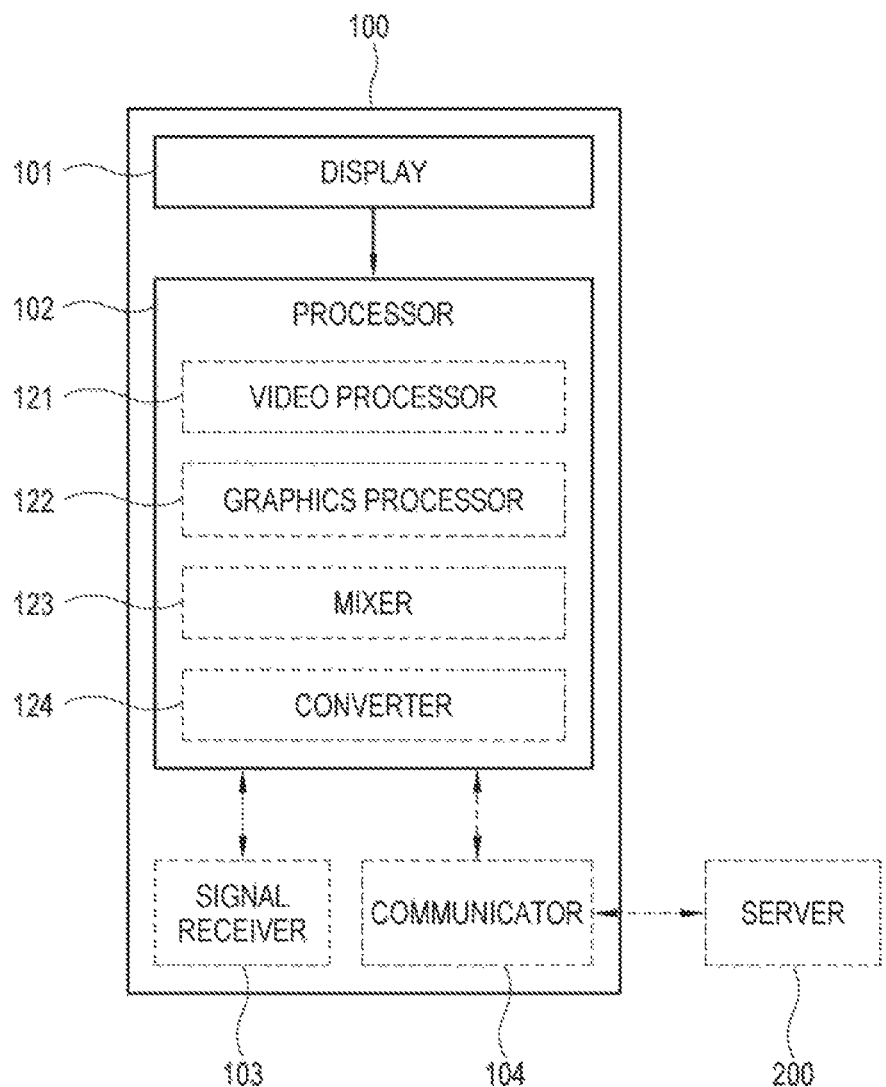
FIG. 2 is a block diagram of the display apparatus and the server according to an embodiment.

FIG. 2 is a block diagram of the display apparatus according to an embodiment. The display apparatus 100 according to an embodiment includes a display 101 and a processor 102. A configuration of the display apparatus 100 shown in FIG. 2 is only an example, and the display apparatus according to an embodiment may be embodied in another configuration. That is, another configuration may be added to the configuration of the display apparatus shown in FIG. 2 according to an embodiment, or a part of the configuration of the display apparatus shown in FIG. 2 may be excluded. In embodiments of the disclosure, each configuration may be embodied in at least one hardware and/or at least one software, or in a circuit or a chip.

The display 101 is capable of displaying an image thereon. There are no limitations to the display 101. For example, the display 101 may be embodied in various display types such as a liquid crystal, a plasma, a light-emitting diode (LED), an organic light-emitting diode (OLED), a surface-conduction electron-emitter, a carbon nano-tube, a nano-crystal, etc. When the display is a liquid crystal, the display 101 includes a liquid crystal display panel, a backlight unit supplying light to the liquid crystal display panel, and a panel driving unit driving the liquid crystal display panel, etc. The display 101 may be an OLED panel, which is a self-emissive type without using a backlight unit.

The processor 102 is capable of processing images. There is no limitation to the kinds of the processes for processing images performed by the processor 102. Image processing performed by the processor 102 may for example include de-multiplexing which classifies an input stream into sub-streams of image, audio, and appended data, decoding which is implemented corresponding to an image format of an image stream, de-interlacing which converts an interlaced-type image stream into a progressive-type one, scaling which adjusts an image stream to have a preset resolution, noise reduction to improve image quality, detail enhancement, frame refresh rate conversion, etc.

The processor 102 may be provided in a single hardware or chip, or provided to include a plurality of hardware units or chips, each of which performs predetermined image processing. For example, the processor 102 may include a video processor 121 processing videos, a graphics processor 122 processing graphics, a mixer 123 mixing processed images, and a converter 124 converting graphics to videos. For the convenience of description, it can be explained that, although an operation is performed by the video or graphics processor according to the configuration of the display apparatus 100, the respective operation is performed by the processor 102.

The processor 102 is capable of controlling operations of all the configurations of the display apparatus 100. The processor 102 may perform a program (or instruction) by which the control operation can be performed. In this case, the display apparatus 100 may further include a non-volatile memory at which the control program is installed, and a volatile memory at which at least a part of the installed control program is loaded. Also, the control program as described above may be stored in any other electric appliance than the display apparatus 100.

The control program may include a program or programs which are embodied in at least one of Basic Input/Output System (BIOS), a device driver, an operating system, firmware, a platform and an application program, i.e., an application. As an embodiment, the application program may be pre-installed or pre-stored in the display apparatus 100 when the display apparatus 100 is manufactured, or later installed in the display apparatus 100 in using the display apparatus 100, upon receiving data of the application program received externally and based on the received data. The data of the application program, for example, may be downloaded to the display apparatus 100 from an external server such as an application market, but there is no limitation in this regard. The processor 102 may be a device, an S/W module, a circuit, a chip, etc. or a combination thereof. Below, for the convenience of description, an operation performed by the processor 102 according to an embodiment with executing a control program will be described as an operation by the processor, without mentioning the control program.

The processor 102 is, for example, capable of controlling the display 101 after processing an image so that the processed image can be displayed. FIG. 2 shows that the display apparatus 100 is configured to perform processing and control together in a single processor 102, which is only an example. The display apparatus 100 according to an embodiment may additionally include a control unit separate from a processing unit.

The display apparatus 100 according to an embodiment may further include a signal receiver 103 and/or a communicator 104, i.e., a communication unit.

The signal receiver 103 receives a video signal. The signal receiver 103 may be equipped with a tuner to receive a video signal in the same form as a broadcasting signal. The tuner is capable of tuning a broadcasting signal from any one of channels, which is selected by a user among a plurality of channels, to receive the signal. Also, the signal receiver 103 may receive a video signal from an external device such as a camera, a server, a universal serial bus (USB) storage, a digital versatile disc (DVD), a computer, etc.

The communicator 104 is capable of communicating with an external device or a server 200 by a wire or wirelessly. For example, the communicator 104 may include a tuner, a set-top box, one or more processors or microprocessors, one or more communication interfaces, one or more transmitters, one or more receivers, etc. For example, at least one of the transmitters and at least one of the receivers may be combined in a transceiver. Accordingly, the communicator 104 may be embodied in a variety of different communication methods, besides a connection unit including a connector or terminal for wire communication. For example, the communicator 104 may be configured to perform at least one of the communications such as Wi-Fi, Wi-Fi Direct, Ethernet, Bluetooth, Bluetooth Low Energy (BLE), a Serial Port Profile (SPP), Zigbee, infrared communication, Radio Control, Ultra-Wide Band (UWB), Wireless USB, Near Field Communication (NFC), etc. The communicator may be a device, an S/W module, a circuit, a chip, etc.

The communicator 104 is capable of transmitting graphic data to the server 200, and receiving from the server 200 video data to which the graphic data is converted. In this regard, there is no limitation to the kinds of signal or data transmitted and received through the communicator 104. For example, the communicator 104 is capable of transmitting to or receiving from an external device or the server 200 a control signal or content data, and transmitting or receiving a video signal. Transmission and reception of a signal or data through the communicator 104 may be performed by control of the processor 102. Below, for the convenience of description, an operation performed by controlling the communicator 104 through the processor 102 according to an embodiment will be described as an operation by the communicator, without mentioning the processor 102, or as an operation by the processor 102, without mentioning the communicator 104.

The "video" (hereinafter also referred to as "video data") means image data provided to correspond to each frame of a moving picture. The video is capable of storing values in a color space corresponding to each pixel, e.g., gray values and difference values, i.e., data values. Accordingly, the video might need a storage space having a size of 1.5 to 2 bytes per pixel. Meanwhile, "graphics" (hereinafter also referred to as "graphic data") generally means image data corresponding to those frames provided not for moving pictures. The graphics store Red, Green, Blue and Alpha values where values in a color space corresponding to each pixel are used, e.g., in the RGBA color space. Accordingly, the graphics might need a storage space of a size 4 bytes per pixel. The content of the graphic data may be a program guide, an advertisement, a value-added service (e.g., stock quotations, news services, etc.) displayed in connection with the video, and the displaying form thereof may appear in text, a stationary image, an interactive menu, a video stream, etc. However, the content and displaying form of the graphic data are not limited thereto.

That is, graphics and a video are identical in that they are information indicating a single frame. However, they are different in color spaces used to indicate one frame, according to which they are different in format and size of the data corresponding to one pixel, further to one frame, that is, storage format. However, the kinds of the color space or the sizes of each pixel as described above are for the convenience of description, and the graphics and video according to the disclosure are not limited thereto. In the disclosure, the video and graphics are substantially distinguished: In a case of the high resolution video, the display apparatus 100 of the disclosure is designed to directly process and then display the video in original resolution, and in case of the graphics, as the display apparatus 100 of the disclosure is designed to process the graphics in a predetermined resolution lower than the high-resolution described above, and high resolution graphics exceeding the predetermined resolution might not be directly processed and displayed in original resolution. For example, where the display apparatus 100 of the disclosure is a 8K TV, a 8K video can be processed and displayed in 8K resolution, whereas the display apparatus 100 designed to process and display the graphics only in up to 2K resolution is often available on the market. In that case, the 8K graphics cannot be processed and displayed in 8K resolution. In this aspect of operation, the video and the graphics can be distinguished from each other.

Figure 3:
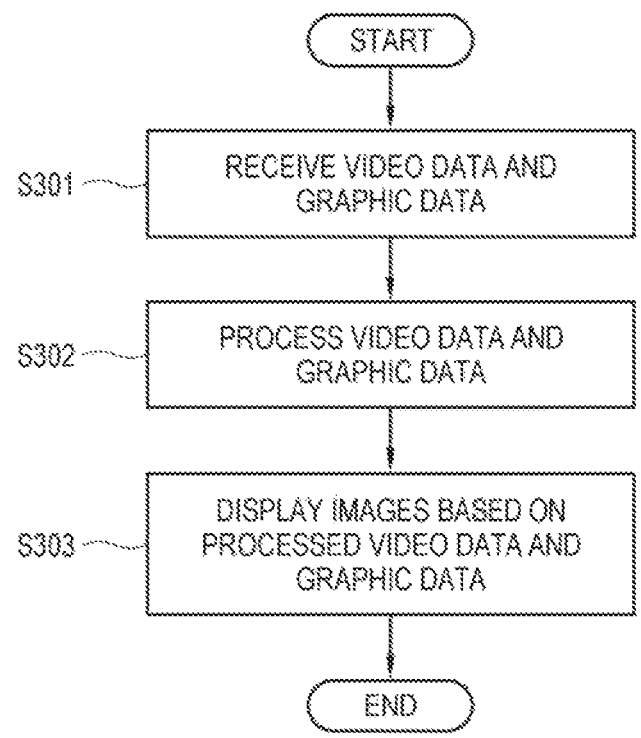
FIG. 3 is a flowchart showing an operation of the display apparatus according to the related art.

With reference to FIG. 3, an operation of the display apparatus according to the related art will be described below. The processor receives video data and/or graphic data (operation S301).

The processor having received the video data and/or graphic data processes the video data and/or the graphic data (operation S302), and displays an image based on the processed video data and/or graphic data (operation S303).

That is, the processor of the display apparatus of the related art processes and displays video data as video data, and processes and displays graphic data as graphic data.

Figure 4:
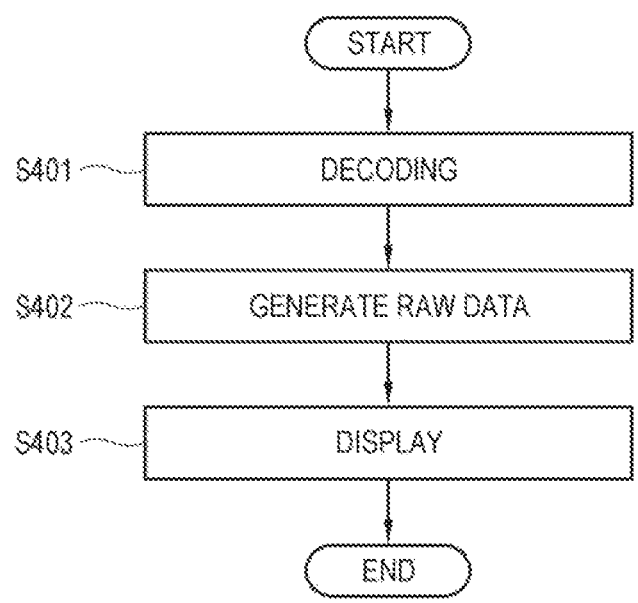
FIG. 4 is a view showing an example of a process of the display device according to the related art.

FIG. 4 is a view showing an example of specifying a process by which the display device according to the related art processes videos or graphic images. For the convenience of description, description will be made based on an example of processing graphic data corresponding to one frame.

Upon receiving graphic data corresponding to a predetermined frame, the processor of the display apparatus performs a decoding process on the received graphic data (operation S401). Based on the decoded graphic data, the processor generates raw data which indicates an image of the respective frame (operation S402). Thereafter, the processor performs a process to allow the image of the respective frame to be displayed on the display, based on the generated raw data.

In this case, in case of a 8K TV, it is possible to process a video up to 8K. However, 8K graphics cannot be processed and displayed in 8K resolution due to restriction on the hardware, etc. The processor may be designed to display graphic data of lower resolution, e.g., 2K or lower resolution, in original resolution. Referring back to FIG. 4, where 8K graphic data is received, the processor decodes the received graphic data (operation S401), from which raw data corresponding to 8K graphic data can be generated (operation S402). Thereafter, it is not possible to perform a process to display the respective raw data on the display in original 8K resolution (operation S403), and the raw data can only be processed and displayed in 2K resolution. Accordingly, in the process of processing and displaying 8K raw data in 2K resolution, a part of the original raw data cannot be utilized and is deformed, thereby resulting in displaying the respective graphic data with degraded image quality on the display. Meanwhile, when 8K video is received, the processor decodes the received 8K video (operation S401). After generating the raw data corresponding to the 8K video (operation S402), the processor can perform a process to process and display the video on the display in original 8K resolution (operation S403).

Figure 5:
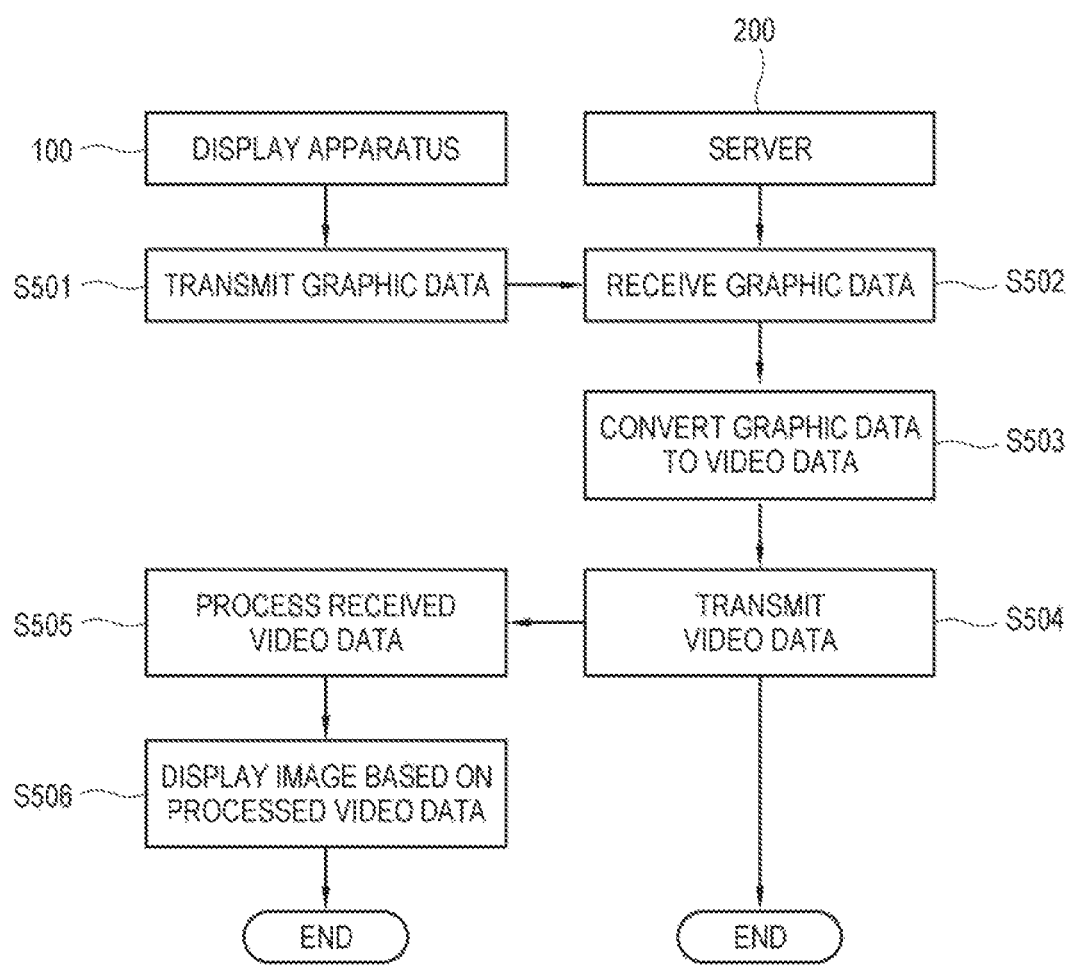
FIG. 5 is a view showing an operation by a display device processing graphics according to an embodiment.

With reference to FIG. 5, in order to address this problem, the processor 102 of the disclosure converts graphics to videos and processes the videos.

The processor 102 of the display apparatus 100 transmits graphic data to the server 200 (operation S501). A processor of the server having received the graphic data from the display apparatus 100 (operation S502) converts the received graphic data to video data (operation S503), and transmits the video data to the display apparatus 100 (operation S504). Upon receiving the video data transmitted by the server 200, the processor 102 of the display apparatus 100 processes the received video data (operation S505) and displays the video data on the display 101 (operation S506).

Figure 6:
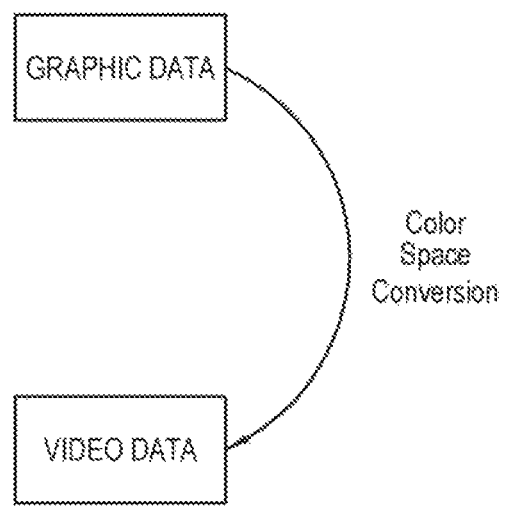
FIG. 6 is a schematic diagram showing an operation by the display device converting graphics to a video according to an embodiment.

In this case, conversion of the graphic data to the video or conversion of graphic data to video data can be performed using a color space conversion method, as schematically shown in FIG. 6. That is, as described above, graphic data and video data are different in color spaces used to indicate one frame, according to which they are different in format and size of the data corresponding to one pixel and one frame. Accordingly, the graphic data can be converted to video data by changing a color space where the graphic data uses to a color space where the video data uses. The color space conversion method may use various techniques or algorithms associated with the color space conversion, without any limitation thereto. The color space conversion may be performed by the server 200, by the processor 102 of the display apparatus 100, or by a converter 124 provided inside the display apparatus 100 or separately.

Thus, the graphic data can be displayed without image quality degradation. For example, in case of displaying graphic data of 8K resolution on the related display apparatus, as the graphic data can only be processed up to 2K resolution according to the related art, the graphic data is finally displayed in 2K resolution although it has 8K resolution, generating image quality degradation. Meanwhile, according to an embodiment, the graphic data of 8K resolution is converted to video data of 8K resolution through the server, and the video data is transmitted back to the display apparatus 100. In this case, as the 8K video data can be directly processed by the 8K TV and displayed in original 8K resolution, different from the 8K graphic data, the 8K video data is finally displayed on the display 101 in original 8K resolution. That is, the graphic data can be displayed without the image quality degradation.

The video data having been received by the processor 102 of the display apparatus 100 may be video data converted after upscaling the graphic data at the server 200. For example, graphic data of 4K resolution is transmitted from the display apparatus 100. Upon receiving the 4K resolution graphic data, the server 200 can convert the 4K resolution graphic data to video data of 4K resolution that is the same as the resolution of the graphic data, or to video data after upscaling the 4K resolution graphic data to 8K resolution. In this case, there is no limitation to an upscaling method of the graphic data. As an exemplary example, the server 200 can upscale the graphic data by utilizing an artificial intelligence (AI) technique. Specifically, the server 200 is capable of determining resolution and/or image type of the received graphic data and upscaling the respective graphic data by using a model for learning an image processing technique most appropriate for the upscaling by use of machine learning or deep learning.

In this way, even though graphic data of low resolution is input, the graphic data can be converted to have high resolution and then be displayed. Although the graphic data of high resolution might not be supported by the display apparatus, the graphic data of high resolution can be displayed without image quality degradation, according to embodiments.

As described, in an embodiment, the display apparatus 100 transmits the graphic data itself to the server 200. However, there is no limitation thereto. For example, the processor 102 of the display apparatus 100 may transmit identification information on the respective graphic data to the server 200, instead of transmitting the graphic data to the server 200, and the server may acquire the graphic data based on the received identification information on the graphic data and convert the graphic data to video data, identify the graphic data corresponding to the respective identification information from the acquired graphic data and convert the graphic data to video data, or locate the video data which was previously converted for the respective graphic data in the server 200 and directly transmit the video data to the display apparatus 100.

According to this, a time spent for communication between the display apparatus 100 and the server 200 and the amount of the communication data may be reduced.

Figure 7:
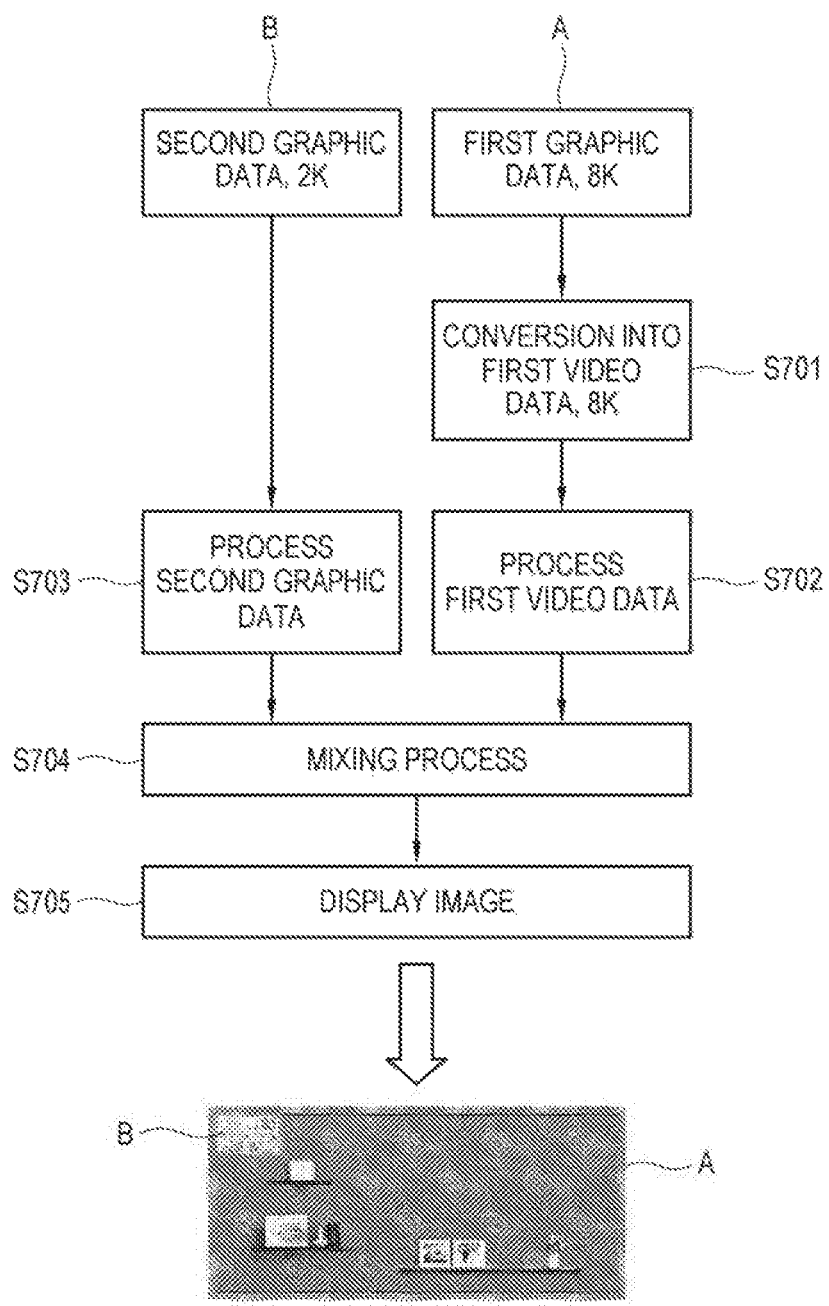
FIGS. 7 and 8 are views showing an operation of the display device according to an embodiment.

FIG. 7 is a view showing an operation of the display apparatus 100 according to an embodiment. The processor 102 of the display apparatus 100 according to an embodiment divides graphic data into first graphic data and second graphic data, transmits the first graphic data to the server, and directly processes and displays the second graphic data on the display 101. That is, the display apparatus 100 of an embodiment displays the second graphic data simultaneously with the first graphic data (converted to video data).

Referring to FIG. 7, the display apparatus 100 receives the first graphic data A of 8K resolution and a second graphic data B of 2K resolution. In a case of the first graphic data A of 8K resolution, the processor 102 of the display apparatus 100 converts the graphic data to the first video data of 8K through the server 200 (operation S701), and thereafter processes the first video data (operation S702), to be displayed. In case of the second graphic data B of 2K resolution, the processor 102 does not convert the second graphic data B to video data, but processes the second graphic data B as graphic data (operation S703), to be displayed. The first graphic data A converted and processed to 8K video data and the second graphic data B processed as graphic data are mixed by the processor 102 or a mixer 123 (operation S704) and then displayed together (operation S705). The mixer 123 may be included into the processor 102, as shown in FIG. 2, or may be separately provided. As an example, the processor 102 synthesizes a first video data to which the first graphic data is converted with the second graphic data, thereby allowing the second graphic data overlaid over the first video data to be displayed. Alternatively, the processor 102 may display the second graphic data in parallel with the first video data, not to be overlaid with the second graphic data.

Where the processor 102 displays the second graphic data to be overlaid over the first video data, as the resolution of the first video data is higher than that of the second graphic data, the second graphic data can be displayed at various positions over the first video data, without any limitation. That is, the processor 102 is capable of displaying the second graphic data at various positions over the first video data. Alternatively, the processor 102 separately receives position information on a position at which the second graphic data is displayed over the first video data, and on this basis, is capable of displaying the second graphic data over the first video data. Likewise, the above description is applicable to a case where the processor 102 displays the second graphic data in parallel with the first video data without being overlaid thereover.

According to this, the graphic data of higher resolution can be displayed simultaneously with another graphic data of lower resolution, without image quality degradation of the high resolution graphic data. As an example, a case where the first graphic data has a higher resolution than the second graphic data has been described above. However, an embodiment is not limited thereto, and can be applied to a case where the resolution of the first graphic data is lower than that of the second graphic data.

The second graphic data according to an embodiment may have a greater degree of change in image than the first graphic data. Here, "the degree of change in image is great" means that a change between a series of images or image frames provided to the display apparatus is great. Accordingly, when the degree of change in image of the second graphic data is greater than that of the first graphic data, this means that a change between a series of graphic image frames provided to the display apparatus 100, including the second graphic data, is greater than a change between a series of the graphic image frames provided to the display apparatus 100, including the first graphic data. For example, the first graphic data is mainly used as a background image of the display 101. Meanwhile, in graphic data, where the second graphic data represents information continuously changed, such as time information, weather information, current execution program information, etc. or includes information whose content is updated in real time, the degree of change in image of the second graphic data may be greater than that of the first graphic data. The degree of change in image of the graphic data can be computed by various methods. For example, differences in each pixel value between a predetermined number of graphic frames are added, or the measured values may be used as values indicating a degree of change in image, using techniques associated with motion detection as known to those skilled in the art.

Where the second graphic data has a greater degree of change in image, the second graphic data is treated as equally as the first graphic data. Accordingly, when a process of converting each graphic data to video data is performed, delay may occur in displaying an image because of the time taken in converting the graphic data to the video data. When this delay becomes to such a degree that can be perceived by a user, inconvenience may be experienced by the user who is using the display apparatus 100. For example, as will be described below with reference to FIG. 9, where a second video data C is displayed together with the second graphic data B and they should coincide with each other in sync because there is interrelationship between information displayed by the second graphic data B and information displayed by the second video data C, when delay is generated to such a degree that the synch with the second video C is dislocated as conversion of the second graphic data B into video data is performed, inconvenience may be experienced by the user. However, where the second graphic data is greater in the degree of change in image than the first graphic data, a problem that the user is given inconvenience due to time delay can be prevented by allowing the second graphic data not to pass through conversion of the graphic data to video data.

According to this, the graphic data of high resolution is displayed without image quality degradation thereof, and simultaneously graphic data having a great change degree of image can be displayed without inconvenience due to delay.

The second graphic data may be graphic data provided through a source, device or channel separate from the first graphic data, or may be acquired from a partial region of the first graphic data. That is, a part or a partial region of the first graphic data may be processed similarly to that of the second graphic data described above.

Figure 8:
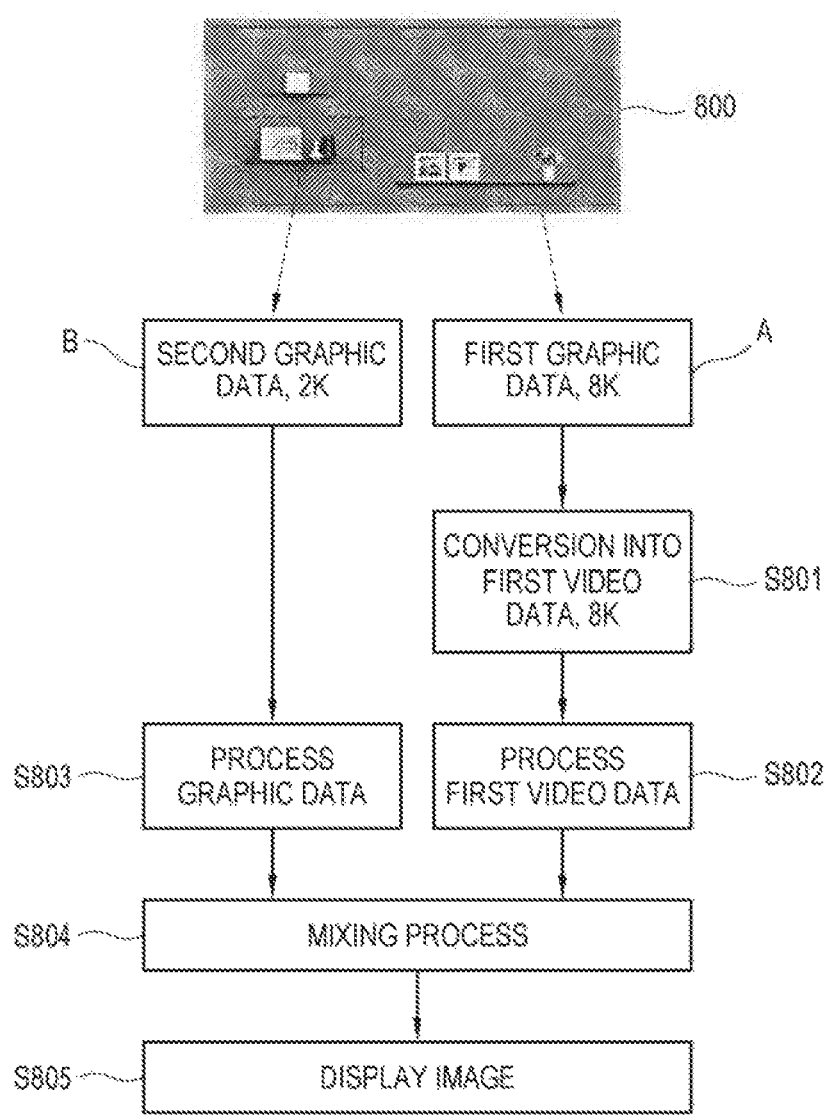

With reference to FIG. 8, reference numeral 800 indicates an example of certain pieces of first graphics. The processor 102 selects a part or a partial region of the first graphic data as second graphic data and processes the respective part or region as graphic data, not performing conversion of the respective part or region to video data, whereas the processor 102 may convert only the other part or region of the first graphic data to video data and process the video data.

In selecting a part or partial region in the first graphic data as second graphic data, the processor 102 may select the second graphic data, referring to the degree of change in image of the predetermined part. That is, a part having a degree of change in image relatively greater in the first graphic data is processed as second graphic data, without conversion to video data, and the other part is converted to video data and then processed, so that the processed video data can be displayed on the display 101.

The operations S701 to S705 described above with reference to FIG. 7 are applicable to the operations S801, S802, S803, S804, and S805 respectively performed for the first graphic data and the second graphic data respectively after a part of the first graphic data is selected as second graphic data.

In this regard, one graphic data is processed by dividing the graphic data into a part to be converted to video data and the other part not to be converted depending upon the content or nature thereof. Accordingly, the high resolution graphic data can be displayed without image quality degradation and simultaneously mitigate the time delay generated according to the conversion.

Figure 9:
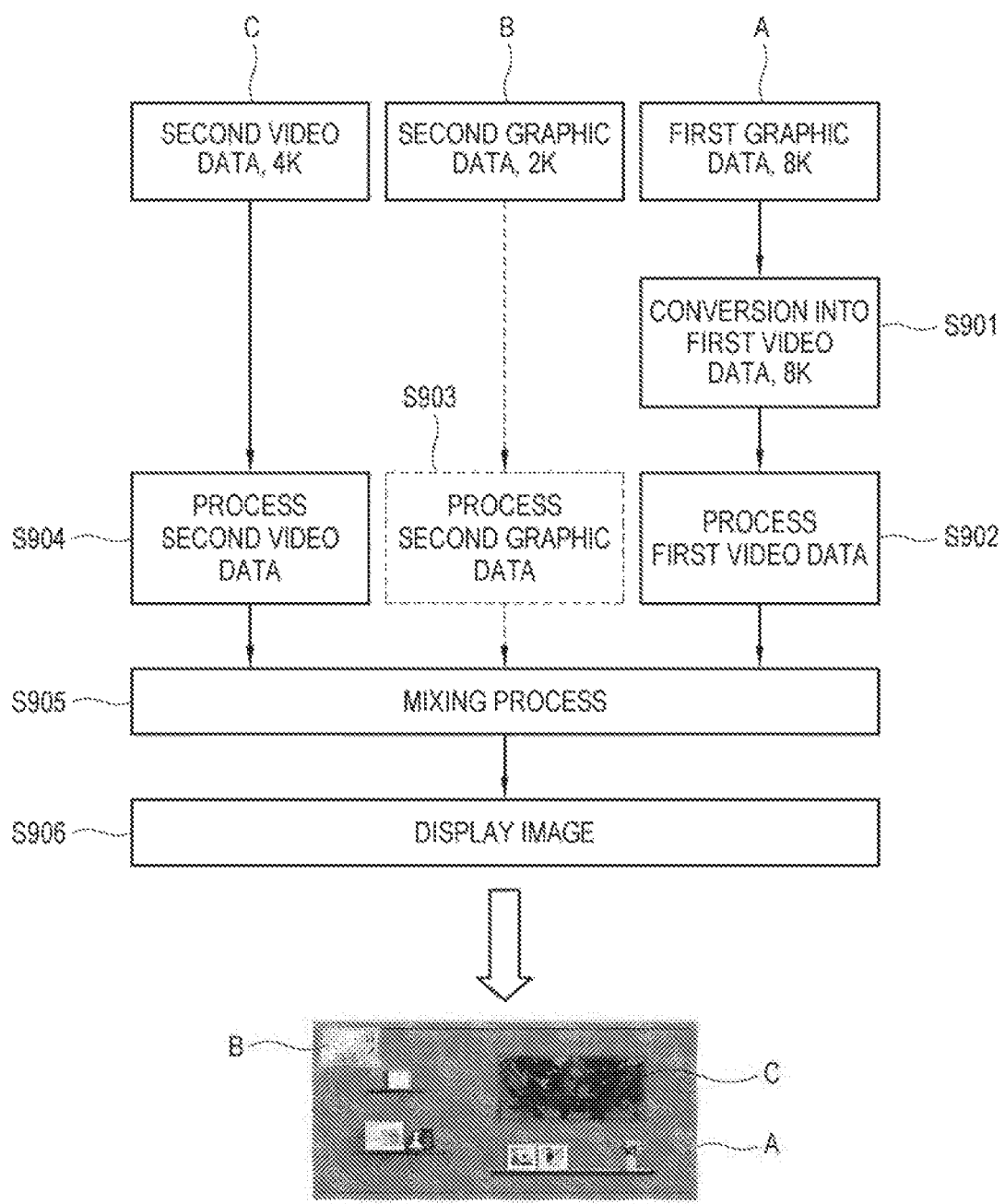
FIGS. 9 and 10 are views showing an operation of the display device according to an embodiment.
Figure 10:
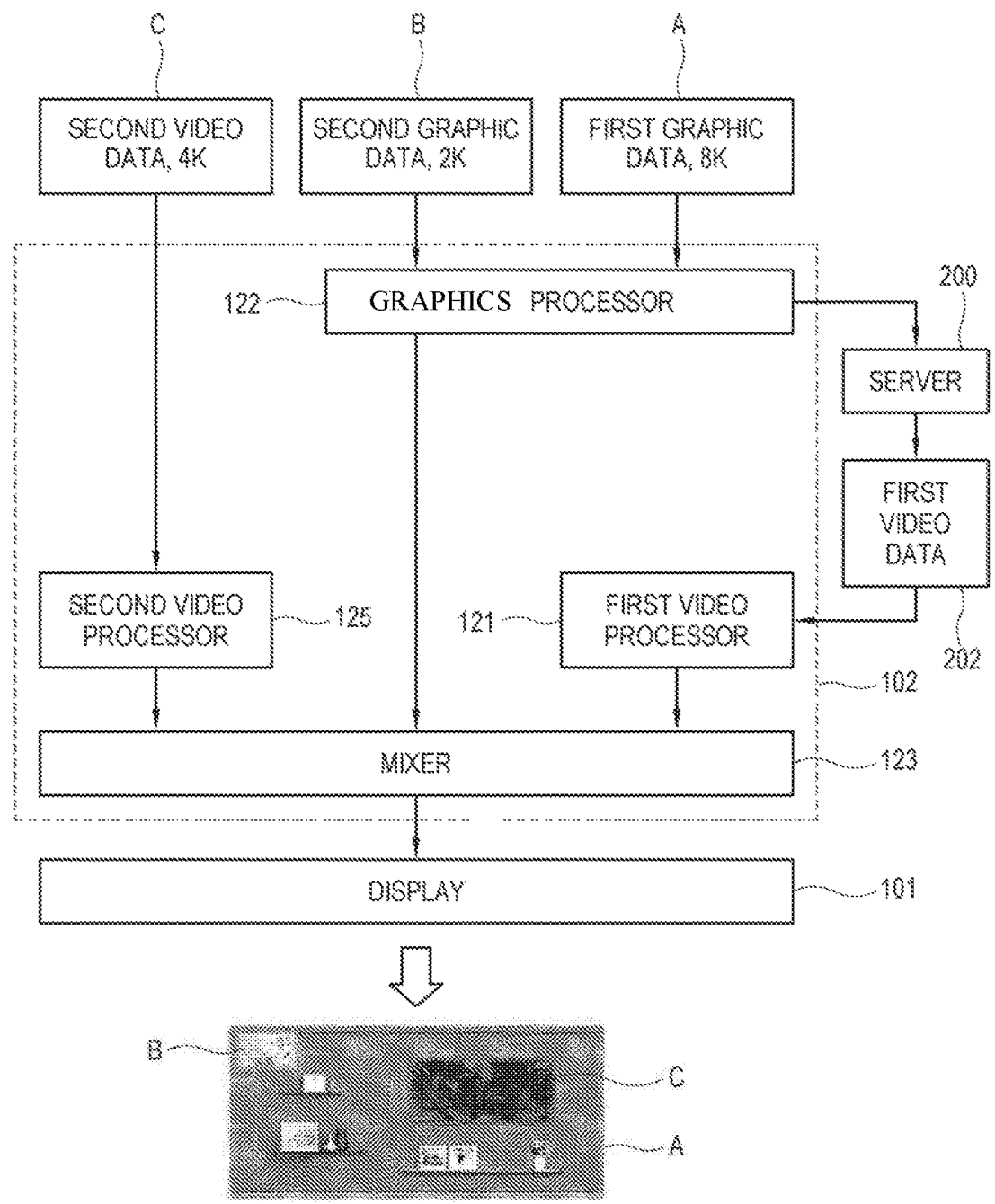

FIGS. 9 and 10 show an operation of a display apparatus 100 according to an embodiment. The processor 102 of the display apparatus according to an embodiment further includes a second video processor 125. The processor 102 displays on the display 101 an image based on the first video data converted based on the first graphic data and received from the server and second video data obtained from another source and directly processed by the second video processor 125. That is, the display apparatus 100 of an embodiment is capable of displaying another video data simultaneously with the video data to which the graphic data is converted by the server 200. For example, the display apparatus 100 may further include a second video processor 125 to process the second video data.

Referring to FIG. 9, the first graphic data A of 8K resolution, second graphic data of 2K resolution, and second video data C of 4K resolution are received by the display apparatus 100. In operations S901, S902, and S903, the processor 102 of the display apparatus 100 according to an embodiment processes the first graphic data A and the second graphic data B as described above with reference to FIG. 7 or 8. With respect to the second video data C, the processor 102 is capable of directly processing the second video data C as video data (operation S904). In this case, the first graphic data A processed after being converted to the first video data 202 with a resolution of 8K, the second graphic data B processed as graphic data, and the second video data C processed as video data may be subjected to a mixing process by a processor 102 or a mixer 123 (operation S905) and then together displayed on the display 101 (operation S906), for example, in an overlapping manner, in parallel, or on two or more separate screens. The resolutions of the first graphic data, the second graphic data, and the second video data as described herein are merely exemplary, respective graphic data and video data are not limited to those resolutions, and there is no limitation even in relations between the respective resolutions.

With reference to FIG. 10, first graphic data A of 8K resolution is first identified as graphic data having a first resolution by the graphics processor 122. Thereafter, the first graphic data A is transmitted to the server 200, and converted to the first video data by the server 200. Thereafter, the first video data is processed by the video processor 121, e.g., a first video processor. Alternatively, the first graphic data A may be transmitted directly to the server 200, not through the graphics processor 122.

Next, second graphic data B is processed directly by the graphics processor 122.

The second video data C is transmitted to and processed by the second video processor 125.

The first video data, the second graphic data B, and the second video data C, which are processed by the video processor 121, the graphics processor 122, and the second video processor 125, respectively, are transmitted to the mixer 123 and processed so as to be simultaneously displayed, and thereafter transmitted to and displayed on the display 101.

According to this, it is possible to display graphic data and video data having high resolution simultaneously, without image quality degradation of the high resolution graphic data.

Figure 11:
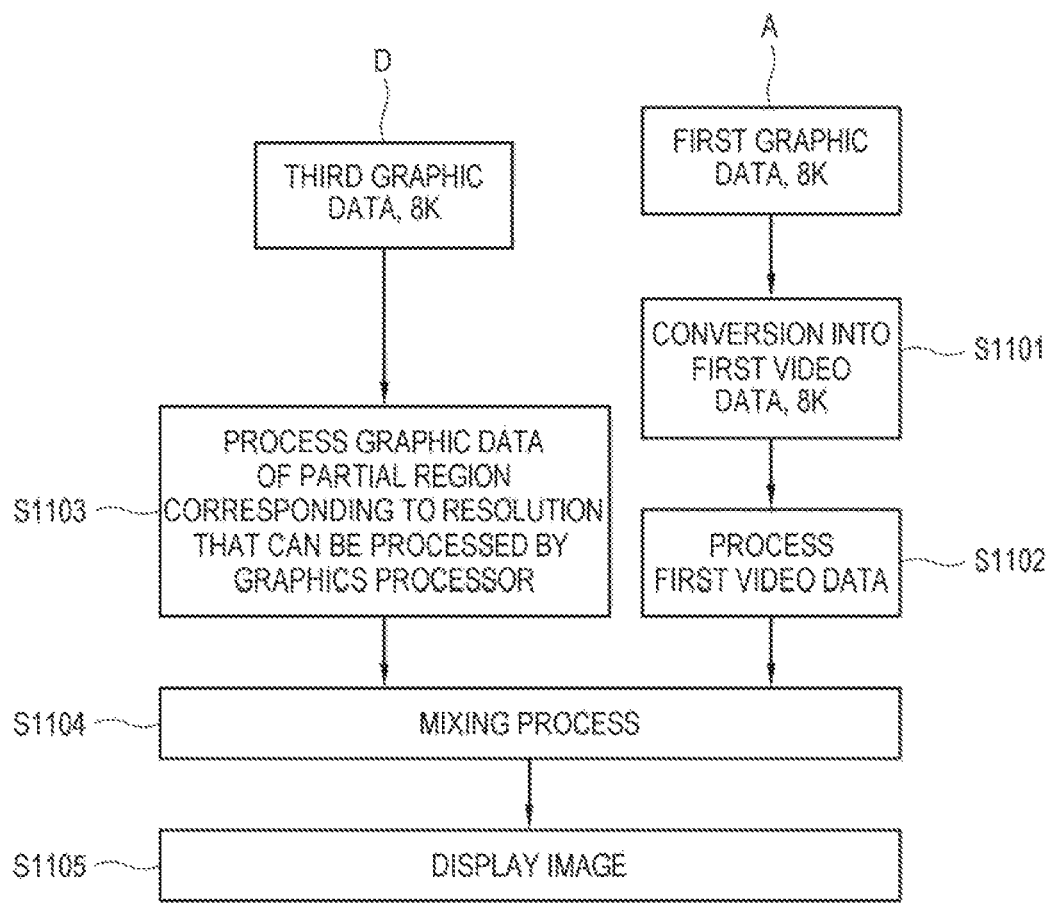
FIG. 11 is a view showing an operation of the display device according to an embodiment.

FIG. 11 is a view showing an operation of the display apparatus 100 according to an embodiment. The processor 102 of the display apparatus 100 according to an embodiment allows the graphics processor 122 to directly process and display graphic data for a partial region corresponding to a resolution that can be processed by the graphics processor 122 with respect to the graphic data. That is, the display apparatus 100 of an embodiment does not transmit to the server 200 a partial region corresponding to a resolution that can be processed by the graphics processor 122 of the display apparatus 100, so that the graphic data can be directly processed and displayed, without conversion to the video data.

Further, the processor 102 can control the graphic data so that the remaining region thereof other than a partial region corresponding to a resolution that can be processed by the graphics processor 122 as graphic data can be transmitted to the server 200. Also, the processor 102 receives from the communicator 104 the video data to which the graphic data of the remaining region is converted, synthesizes the same with the graphic data of the partial region directly processed by the graphics processor 122, and displays the synthesized data on the display 101.

An example that a partial region of the graphic data is directly processed by the graphics processor 122 of the display apparatus 100 and the remaining region is transmitted to the server 200 and converted to video data has been described above. However, an embodiment is not limited thereto. For example, with respect to two graphic data sets different from each other, the processor 102 of the display apparatus 100 according to an embodiment allows the graphics processor 122 of the display apparatus 100 to directly process one graphic data (hereinafter referred to as "the third graphic data"), and transmits the other graphic data (hereinafter referred to as "the first graphic data") to the server 200 so as to be converted to the video data. In this case, the third graphic data may be graphic data having a greater degree of change in image than the first graphic data, but an embodiment is not limited thereto.

Also, the processor 102 of the display apparatus according to an embodiment does not directly process the entirety of the third graphic data, but may directly process the third graphic data only with respect to a partial region corresponding to a resolution that can be processed by the graphics processor 122. For example, where two 8K graphic data sets are received, the graphic data having a relatively small degree of change in image between the two graphic data sets may correspond to the first graphic data and is thus converted to and processed as video data, whereas the other graphic data having a relatively great degree of change in image may correspond to the third graphic data and is thus not converted to video data but processed as graphic data. However, the third graphic data having a relatively great degree of change in image is processed within the limit of the resolution that the display apparatus 100 can process as graphic data, e.g., by selecting and processing a region corresponding to 2K resolution.

With reference to FIG. 11, the first graphic data and the third graphic data, both of which have 8K resolution, and the third graphic data has a greater degree of change in image than the first graphic data. The processor 102 of the display apparatus 100 according to an embodiment converts the first graphic data to 8K video data through the server 200

(operation S1101) and processes the video data, e.g., the first video data (operation S1102). Meanwhile, with respect to the third graphic data, the processor 102 selects a partial region of the third graphic corresponding to 2K resolution and performs graphic processing for the respective region (operation S1103). Thereafter, the processor 102 performs mixing processing of the video data and the graphic data, both of which have been processed (operation S1104), and displays the processed image on the display 101 (operation S1105).

According to this, even where two high resolution graphic data are received, the two graphic data can be displayed without image quality degradation, and even the graphic data having a greater degree of change in image can be displayed without causing any inconvenience due to delay.

According to an embodiment, there is no limitation to a method that the processor 102 selects a partial region of one graphic data that is directly processed by the graphics processor 122 of the display apparatus 100. As an example, the processor 102 may select an arbitrary region in the third graphic data, which corresponds to a resolution that can be processed by the graphics processor 122, e.g., 2K resolution. As another example, the processor 102 may select a part at which the degree of change in image is relatively great in the third graphic as a region corresponding to the 2K resolution. The part at which the degree of change in image is relative great in the third graphic may mean a part at which any change in the content of that information often occurs. This also may mean that the part might need continued attention by the user. Accordingly, where the part at which the degree of change in an image is relatively great is selected, processed and displayed, this may be effective in displaying information useful to the user without omission or delay.

Figure 12:
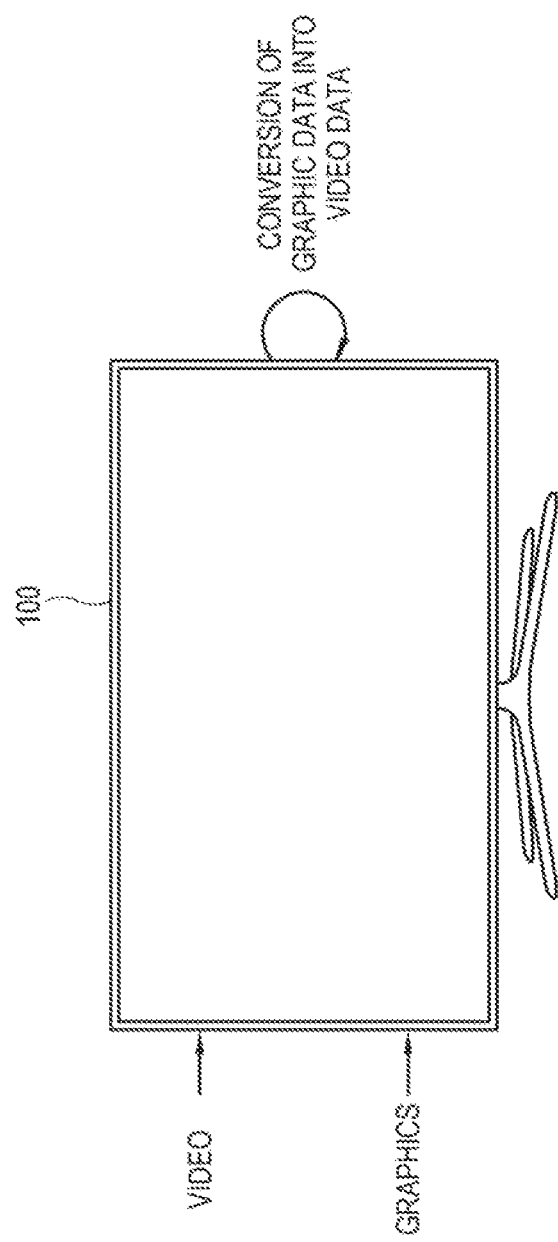
FIGS. 12 and 13 are views showing a display apparatus and an operation thereof according to an embodiment.
Figure 13:
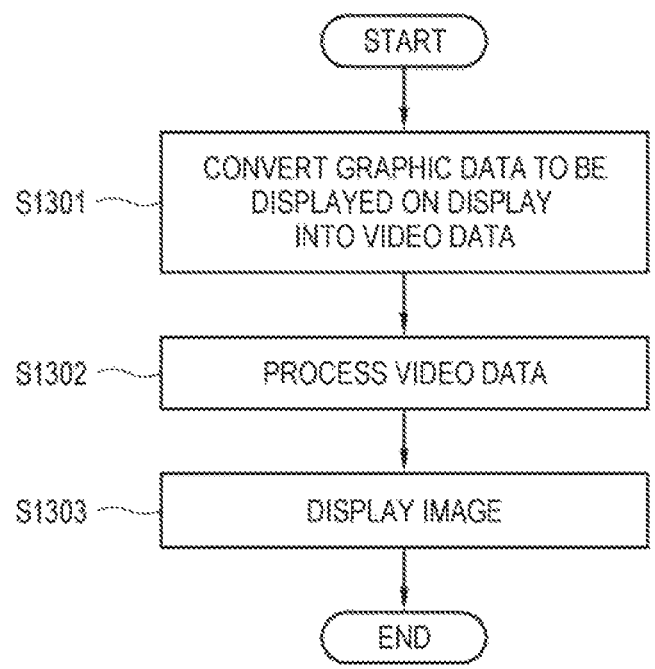

An embodiment has been described above that an operation of converting the graphic data to video data is performed through a server. However, this disclosure is not limited thereto. For example, an operation of converting the graphic data to video data may be directly performed in the display apparatus 100 as in FIG. 12. The conversion of the graphic data to video may be performed by the processor 102 of the display apparatus or a converter 124. With reference to FIG. 13, the processor 102 of the display apparatus 100 converts graphic data to be displayed on the display to video data, e.g., the first video data (operation S1301). The content as described thus far is also applicable to a specific method to convert graphic data to video data. The processor 102 processes the video data (operation S1302). Then, the processor 102 displays a processed image (operation S1303). According to this, as an operation to convert the graphic data to video data is directly performed in the display apparatus, quicker processing is available. Additionally, embodiments described above, e.g., with respect to the processing and displaying of the second video data, the second graphic data, and the partial region of the graphic data, are equally applicable here.

According to the disclosure, it is possible to display graphics of high resolution without the image quality degradation.

Although a few embodiments have been shown and described, it will be appreciated by those skilled in the art that changes may be made in these embodiments without departing from the principles and spirit of the disclosure, the scope of which is defined in the appended claims and their equivalents.

What is claimed is:

1. A display apparatus comprising:
a display;
a communicator configured to communicate with a server; and
a processor, by which video data having a first resolution is processible, and which is configured to:
receive content comprising graphic data,
identify, in the received graphic data, first graphic data having the first resolution and second graphic data having a second resolution, wherein the first resolution is greater than the second resolution, the first graphic data is not processible by the processor and the second graphic data is processible by the processor,
in response to the identifying the first graphic data having the first resolution in the received graphic data that is not processible by the processor, control the communicator to transmit the first graphic data to the server, and, subsequent to the transmitting the first graphic data to the server, receive, in return from the server, the video data having the first resolution, wherein the received video data corresponds to the transmitted first graphic data which could not be processed by the processor due to having the first resolution and has been converted into the video data by the server,
process the received video data and the second graphic data, and
display the processed video data and the second graphic data on the display,
wherein the second graphic data is greater in a degree of change in an image than the first graphic data.

2. The display apparatus according to claim 1, wherein the processor is further configured to:
obtain synthetized data by synthesizing the video data with the second graphic data, and
display the video data and the second graphic data as the synthesized data.

3. The display apparatus according to claim 1, wherein, in the identifying the first graphic data, the processor is further configured to:
identify among the graphic data a part of the graphic data that has a greater degree of change in an image than a remaining part of the graphic data, and
divide the graphic data so that the second graphic data includes the part of the graphic data that has the greater degree of change in the image, and the first graphic data includes the remaining part of the graphic data.

4. The display apparatus according to claim 1, wherein the processor is further configured to process the second graphic data without converting the second graphic data into video data.

5. The display apparatus according to claim 1, wherein the video data obtained by converting the first graphic data by the server is a first video data, and
the processor is further configured to:
directly process a second video data received via the communicator from an external device,
obtain synthesized data by synthesizing the first video data received from the server with the directly processed second video data, and
display the second graphic data and the synthesized data on the display.

6. The display apparatus according to claim 1, wherein the processor comprises a graphics processor configured to directly process and display the second graphic data in correspondence with the second resolution processible by the graphics processor.

7. The display apparatus according to claim 6, wherein the processor is further configured to:
  obtain synthesized data by synthesizing the video data with the second graphic data directly processed by the graphics processor, and
  display the video data and the second graphic data as the synthesized data.

8. A display apparatus comprising:
  a display; and
  a processor, by which video data having a first resolution is processible, and which is configured to:
    receive content comprising graphic data to be displayed on the display,
    identify, in the received graphic data, first graphic data having the first resolution and second graphic data having a second resolution, wherein the first resolution is greater than the second resolution, the first graphic data is not processible by the processor and the second graphic data is processible by the processor,
    in response to the identifying the first graphic data having the first resolution in the received graphic data that is not processible by the processor, convert the first graphic data into video data having the first resolution, wherein the video data corresponds to the first graphic data which could not be processed by the processor due to having the first resolution, and
    process and display the video data having the first resolution on the display,
  wherein the second graphic data is greater in a degree of change in an image than the first graphic data.

9. The display apparatus according to claim 8, wherein the processor is further configured to convert the graphic data into the video data by performing a color space conversion.

10. A control method of a display apparatus comprising a display, the control method comprising:
  receiving content to be displayed on the display, the content comprising graphic data;
  identifying, in the received graphic data, first graphic data having a first resolution and second graphic data having a second resolution, wherein the first resolution is greater than the second resolution, the first graphic data is not processible by a processor of the display apparatus, the second graphic data is processible by the processor, and a video data having the first resolution is processible by the processor;
  in response to the identifying the first graphic data having the first resolution in the received graphic data that is not processible by the processor, transmitting the first graphic data to a server, and, subsequent to the transmitting the first graphic data to the server, receiving, in return from the server, the video data having the first resolution, wherein the received video data corresponds to the transmitted first graphic data which could not be processed by the processor due to having the first resolution and has been converted into the video data by the server;
  processing the received video data and the second graphic data; and
  displaying the processed video data and the second graphic data on the display,
  wherein the second graphic data is greater in a degree of change in an image than the first graphic data.

11. The control method according to claim 10, further comprising:
  obtaining synthesized data by synthesizing the video data received from the server with the second graphic data; and
  displaying the video data and the second graphic data as the synthesized data on the display.

12. The control method according to claim 10, wherein the identifying the first graphic data further comprises:
  identifying among the graphic data a part of the graphic data that has a greater degree of change in an image than a remaining part of the graphic data; and
  dividing the graphic data so that the second graphic data includes the part of the graphic data that has the greater degree of change in the image, and the first graphic data includes the remaining part of the graphic data.

13. The control method according to claim 10, wherein the processing further comprises:
  processing the second graphic data without converting the second graphic data into video data.

14. The control method according to claim 10, wherein the video data obtained by converting the first graphic data by the server is a first video data, and
  the control method further comprises:
    obtaining synthetized data by synthesizing the first video data received from the server with the directly processed second video data; and
    displaying the second graphic data and the synthesized data on the display.

15. The control method according to claim 10, wherein the processing further comprises:
  directly processing the second graphic data, in correspondence with the second resolution processible by the display apparatus.

* * * * *